United States Patent [19]

Derr, Jr. et al.

[11] 4,126,539
[45] Nov. 21, 1978

[54] METHOD AND ARRANGEMENT OF APPARATUS FOR HYDROGENATING HYDROCARBONS

[75] Inventors: Walter R. Derr, Jr., Voorhees; Lawrence E. Gallagher, Titusville; James H. Haddad, Princeton Junction; Stephen J. McGovern, Bellmawr; Klaus W. Schatz, Wenonah; Fritz A. Smith, Haddonfield, all of N.J.

[73] Assignee: Mobil Oil Corporation, New York, N.Y.

[21] Appl. No.: 857,158

[22] Filed: Dec. 5, 1977

[51] Int. Cl.² .................. C10G 13/06; B01F 3/04; B01J 3/02
[52] U.S. Cl. .................................. 208/108; 422/212; 208/143; 208/146; 208/213; 261/94
[58] Field of Search .............. 208/108, 143, 213, 146; 261/94; 23/288 R

[56] References Cited

U.S. PATENT DOCUMENTS

| | | | |
|---|---|---|---|
| 2,055,162 | 9/1936 | Weber | 261/94 |
| 3,592,612 | 7/1971 | Ballard et al. | 208/108 X |
| 3,824,081 | 7/1974 | Smith et al. | 208/146 X |
| 3,915,847 | 10/1975 | Hutchings | 208/146 |
| 3,925,039 | 12/1975 | Ziegler | 261/94 X |

Primary Examiner—Delbert E. Gantz
Assistant Examiner—G. E. Schmitkons
Attorney, Agent, or Firm—Charles A. Huggett; Carl D. Farnsworth

[57] ABSTRACT

A CHD reactor is modified to include a feed nozzle arrangement which hydrogen-saturates the charged liquid before distribution across the fixed catalyst bed by a pair of gas/liquid distributor trays. Product is recovered from the catalyst bed through an apparatus arrangement comprising Glitsch grid to maintain low pressure drop in the system.

9 Claims, 5 Drawing Figures

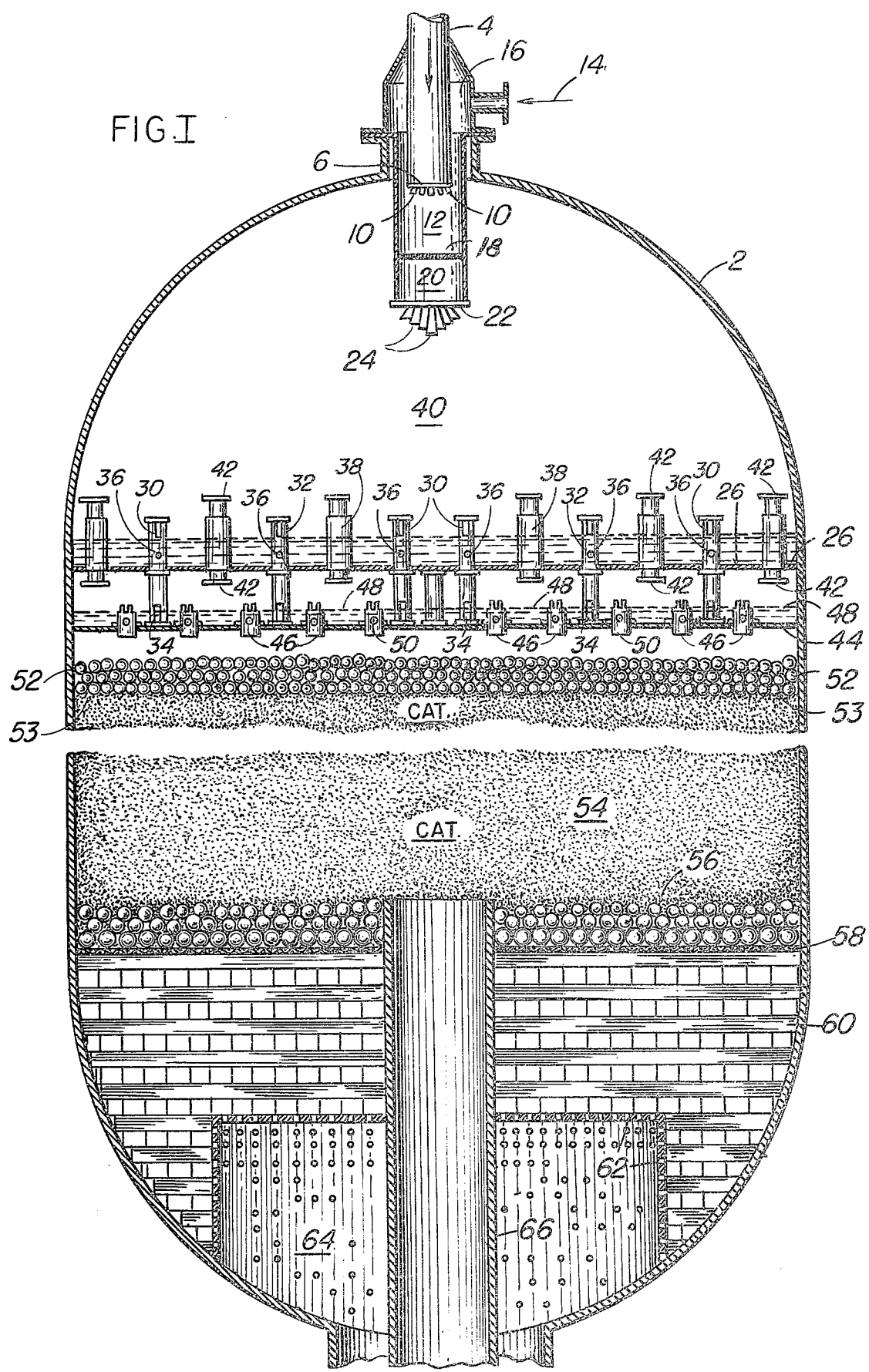
FIG. I

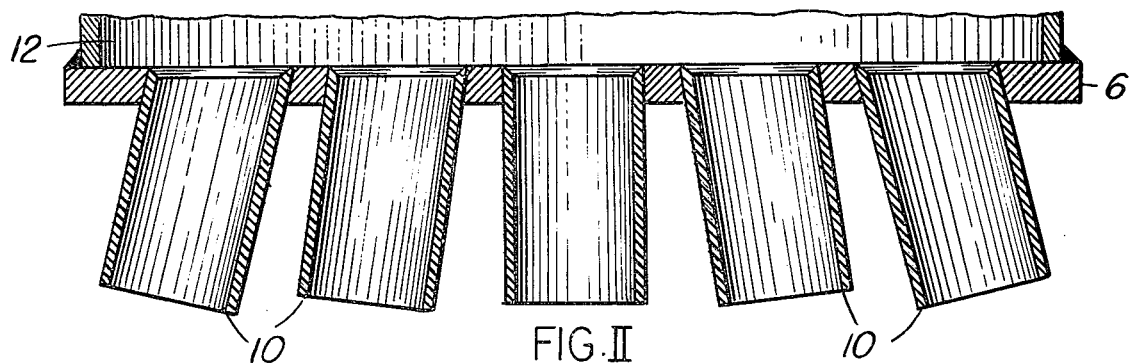
FIG. II
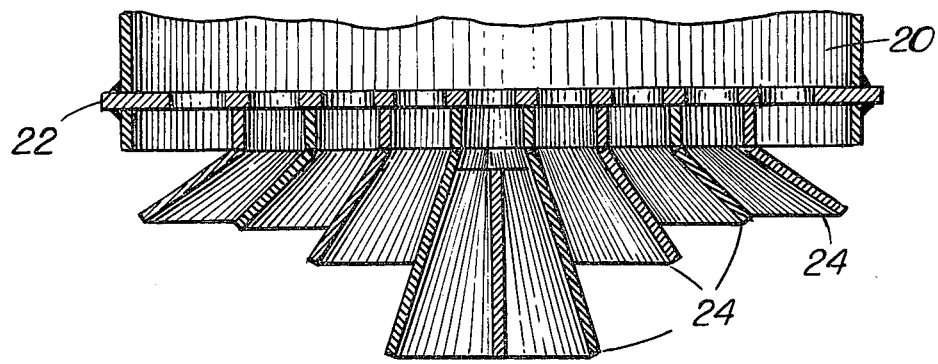
FIG. III
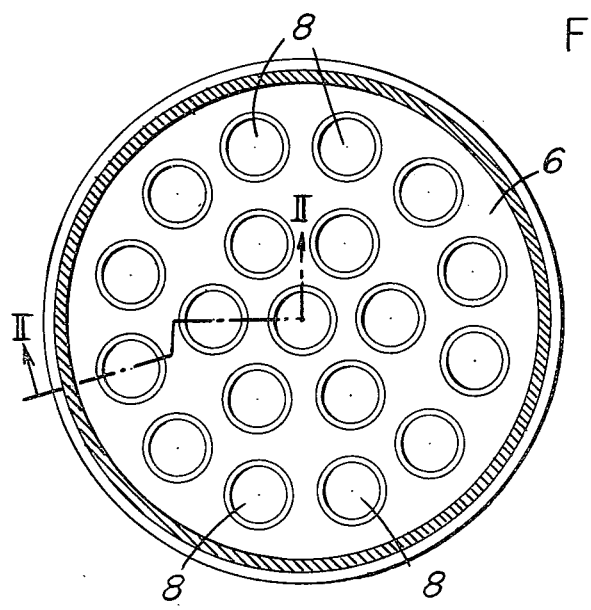
FIG. IV
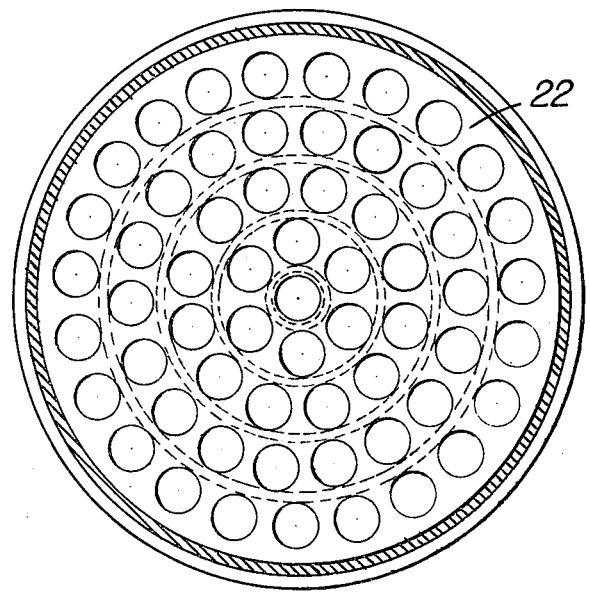
FIG. V

METHOD AND ARRANGEMENT OF APPARATUS FOR HYDROGENATING HYDROCARBONS

BACKGROUND OF THE INVENTION

The art of hydrogenating hydrocarbons by processes identified with hydrotreating, hydrofining and catalytic desulfurization of sulfur containing hydrocarbons in the presence of hydrogen at elevated temperatures up to about 1000° F. and at elevated pressures up to about 200 atmospheres is well known at this stage of the art. Furthermore, a wide range of catalyst compositions have been proposed for effecting such hydrogenating reactions including the oxides and sulfides of, for example, aluminum, iron, nickel, cobalt, chromium, molybdenum, copper, manganese, tungsten and mixtures thereof including materials such as molybdates, thiomolydates, tungstates, and aluminates of metals of the VI Group of the Periodic Table, either alone or in combination with other catalyst. Pore size distributions of selective ranges for various catalyst compositions have been used with varying degrees of success depending upon the contaminants to be removed, the composition of the charge being processed and the severity of the operation to achieve a desired result. The investment and operating costs of such processes vary considerably, depending on efficiency of utilization of available equipment, source of reacting constituents and the severity of the operation obtainable with the equipment available to maintain desired operating temperature, pressure and hydrogen to hydrocarbon conditions.

The present invention is concerned with modification and/or improvements in available equipment permitting increased throughput in a given process arrangement and reactor system without adversely effecting hydrogenation.

THE INVENTION

This invention relates to an improved method and arrangement of reactor apparatus for achieving substantial improvement in the efficiency of a hydrocarbon hydrogenation operation. The invention is particularly concerned in providing a hydrogenation reactor arrangement more suitable for obtaining a uniform distribution of hydrocarbon and hydrogen reactant across the horizontal cross-sectional area of the catalyst bed; more complete saturation of hydrocarbon feed with a hydrogen rich hydrogenating gas before contact with the catalyst bed, a desired restricted pressure drop through the reactor system, and a recovery of hydrogenated product from the reactor arrangement in a manner designed to minimize reactant downflow differences in vertical segments of the catalyst bed and particularly adjacent to the outer vertical portions of the fixed catalyst bed.

In a more particular aspect, the present invention is concerned with a fixed catalyst bed hydrogenating reactor arrangement with built in liquid/gas distributor means and hydrogenated product recovery means from the bottom of a downflow reactor system which permits maintaining the liquid/gas downward concurrent flow thereof through the catalyst in the known pulsing mode or regime. In this known flow technique known as the pulsing regime, liquid and gas downwardly traverse the fixed catalyst bed in a form identified as waves or segregated slugs of reactants.

The subject of liquid/gas distribution measurements in the pulsing regime of a two-phase concurrent flow in packed beds has been studied by many different individuals over the past years. An article by W. E. Beimesch and D. P. Kessler on the subject, published in AiChE Journal (Vol. 17, No. 5), dated September, 1971, and beginning on page 1160 provides an excellent review of this operating mode and work by others. The improved method and arrangement of apparatus of this invention is particularly suitable for the treatment of hydrocarbon feed materials with hydrogen in this pulsing regime under a wide variety of process conditions including space velocity, temperature, pressure, and ratio of hydrogen to hydrocarbon feed material. That is, reaction temperatures may be within the range of about 450° F. up to about 850° F., pressures within the range of about 400 psig up to about 2000 psig, liquid hourly space velocities within the range of about 0.2 to about 10 and ratios of total hydrogen to hydrocarbon feed in the range of about 0.5 to 10.0 moles of hydrogen per mole of hydrocarbon.

The hydrocarbons to be hydrogenated and/or desulfurized according to this invention include those referred to as straight run hydrocarbons or hydrocarbon products of cracking, gasoline, naphtha, kerosene, gas oils, cycle stocks, products of thermal cracking, residual oils, coker distillates, etc. Also straight run products of distillation, both atmospheric and vacuum distillation products may be charged as feed to the process. The sulfur concentration of these various hydrocarbons vary over a wide range and may vary within the limits of about 0.03 up to about 10 or 15 percent by weight. It is contemplated hydrogen treating hydrocarbon fractions also having a gravity within the range of about −20° API up to about 50° API and comprising sulfur concentrations within the range of about 0.25 to about 6.0 percent by weight. The hydrocarbon feed stocks processed according to this invention may have an initial boiling point within a range of from about 70° F. up to about 800° F. and a 90 percent end boiling point within the range of from about 250° F. up to about 1050° F. at atmospheric pressure. The hydrocarbon feed hydrogenated, hydrotreated or hydrofined according to this invention may be processed in the liquid, vapor or mixed-liquid vapor state.

Catalysts which may be employed in the method and apparatus of this invention with varying degrees of success include any of the well known prior art catalysts such as, for example, amorphous and crystalline zeolite materials including silica-alumina and alumina compositions promoted with a hydrogenation/dehydrogenation active metal component. The desulfurizing process of this invention may be accomplished in the presence of chromia-molybdenum-trioxide, nickel-molybdate supported on alumina, nickel-tungsten on alumina, silica/alumina or faujasite Y crystalline zeolite, cobalt-molybdate-alumina and nickel-cobalt-molybdate catalysts. Other catalyst which may be used include platinum or palladium supported on alumina, silica/alumina or ZSM-5. A Group VI metal oxide and/or sulfide, specifically chromia and/or molybdenum trioxide supported on alumina; the Group VI metal or compound may be promoted with a metal or compound of a metal of Group VIII such as the oxides and/or sulfides of iron, cobalt and nickel. Another class of catalysts which may be employed include heteropoly acids which have molybdenum, chromium, vanadium and/or tungsten as the outer acid-forming element and phosphorous silicon, germanium, platinum, etc., may be present as the central acid forming component. Examples of the heteropoly acids are phosphomolybic acid, phosophotungstic acid, either used alone or with a support material such as silica-alumina.

In accordance with this invention, a given reactor arrangement is modified to particularly handle a concurrent downflow of hydrogen rich gas and hydrocarbon reactant under conditions particularly promoting hydrotreating, hydrofining, and desulfurization of a hydrocarbon reactant under flow conditions known as the pulsing regime. It is contemplated employing the arrangement to accomplish dewaxing and hydrocracking operations also. More particularly, the reactor arrangement of this invention is modified to accomplish more complete saturation of hydrocarbon reactant with hydrogen rich gas in a reactant inlet mixing zone or means arrangement of restricted pressure drop which is also instrumental for providing a relatively uniform dispersal of liquid droplet across the cross-sectional area of a liquid/gas distributor tray or trays above the catalyst bed to be contacted.

The distribution of hydrogen saturated liquid and excess hydrogen rich gas is accomplished according to this invention by two vertically spaced apart gas/liquid distributor downcomer means positioned substantially immediately above the upper surface of a fixed bed of catalyst. The upper tray surface comprising the gas/liquid distribution means of this invention is perforated by a plurality of relatively uniformly dispersed gas phase downcomer means interdisposed with a plurality of relatively uniformly dispersed liquid phase downcomer means. The gas and liquid downcomers are of the weir type which maintains a desired level of liquid upon the upper tray surface throughout its cross-sectional area thereof. In addition, the liquid downcomers are provided with one or more liquid flow through holes, or orifices, in the downcomer intermediate the tray surface and the liquid weir surface of the downcomer. The liquid flow through holes are sized to permit only a portion of the tray accumulated liquid to flow through the holes with the remaining portion of liquid overflowing the weir of each downcomer and flow downward therethrough. This arrangement assures the flow of liquid through each liquid downcomer of the upper distributor tray.

A second gas/liquid distributor tray is positioned beneath said upper distributor tray and above said catalyst bed. The second distributor tray is provided with a plurality of gas/liquid downcomer means of the weir type uniformly distributed across the cross-sectional area of the tray. The weir type distributors of the second tray maintain a desired liquid level on the tray so that saturated liquid and hydrogen rich gas pass downwardly through the open ended downcomers under flow conditions of limited pressure drop. The downcomers of the second tray are provided with one or more liquid flow through holes, or orifices, in the downcomer positioned intermediate the tray and the upper surface of the downcomer weir. These liquid flow through holes are sized to permit flow of only a portion of the highest liquid flow permitted by the tray and assure that some liquid always flows through each downcomer.

The fixed catalyst bed comprising catalyst particles in a size range of about 1/32 inch and ⅛ inch is supported by an arrangement in the bottom portion of the reactor designed to limit the pressure drop encountered to a desired low limit: That is, in a specific embodiment, the fixed catalyst bed is supported by layers of ceramic balls in a size range of ¼ inch to 2 inches resting on a grid of heavy-duty screen of stainless steel rods spaced to form flow through space or openings between the rods of about ½ inch. The grid of rods is supported by layers of Glitsch grid filling the bottom portion of the reactor and arranged about a perforated cylindrical member through which the products of reaction pass to the withdrawal conduit of the reactor. Glitsch grid is known in the prior art as an open grid arrangement of formed sheet metal having a low pressure drop, providing large surface contact area and large free space capacity. Grid means of this type is disclosed and particularly described in U.S. Pat. Nos. 3,079,134 and 3,343,821. In the apparatus arrangement of this invention, horizontal sections of Glitsch grid means are vertically adjacently tiered one upon another in open flow-through arrangement to provide support for the bed of catalyst thereabove, the layers of ceramic balls and the grid means supporting the ceramic balls.

Having thus generally described the improved method and apparatus of this invention, reference is now had by way of example to the drawings which identify preferred arrangements comprising the apparatus of the invention.

FIG. 1 is a diagrammatic representation in elevation of the reactor arrangement of the invention.

FIG. II is a diagrammatic representation in cross-section of the liquid nozzle arrangement of the liquid/gas saturator inlet means.

FIG. III is a diagrammatic representation in cross-section of the droplet forming discharge spray nozzle of the inlet means.

FIG. IV is a diagrammatic representation of the horizontal perforated plate member feeding liquid and gas to the nozzles of FIG. III.

FIG. V is a diagrammatic representation of the horizontal perforated plate member feeding liquid and gas to the annular baffles of the spray nozzle arrangement of FIG. III.

Referring now to FIG. I by way of example, there is shown in diagrammatic elevation arrangement, a reactor arrangement for accomplishing the method of hydrogenation encompassed by the invention and particularly directed to desulfurizing a sulfur contaminated hydrocarbon feed with hydrogen containing gas. A reactor 2 is provided with a reactant feed mixing spray nozzle means comprising a liquid inlet conduit 4 provided with a perforated grid member 6 (FIG. IV) at the bottom end thereof with liquid flow through holes 8. The holes of grid member 6 are each provided with downwardly extending relatively short cylindrical tubes to provide a plurality of separate liquid discharge nozzles 10, as shown in FIG. II, discharging into space or chamber 12. Hydrogen rich gas is introduced by conduit 14 to annular space 16 in open communication with chamber 12. The lower portion of chamber 12 is provided with a perforated diffuser plate 18 through which liquid and hydrogen rich gas is passed and thence into chamber 20. The liquid saturated with hydrogen rich gas and excess hydrogen gas then pass through a perforated grid member 22 (FIG. V) in open communication with sloping annular baffle members 24 shown in greater detail by FIG. III. In this arrangement, the liquid sprayed by nozzles 10 into chamber 12 in a highly turbulent state is mixed with hydrogen rich gas passed thereto by the annular spaces about pipe 4 thereby high liquid surface area promoting the saturation of the liquid with hydrogen. The diffuser plate 18 provides additional turbulence and liquid surface area for saturation of the liquid with hydrogen before discharge thereof from chamber 20 by the liquid droplet forming and spray means comprising perforated plate 22 and diverging baffles 24. In a specific embodiment, plate 18 is provided with a flow through area of at least 45 percent, thereby avoiding undesired pressure drop through the plate.

The spray head comprising annular sloping baffles 24 and perforated grid 22 are arranged with respect to one another to cause a spray of hydrogen saturated liquid droplets to be relatively uniformly dispersed over the cross-sectional area of the upper liquid distributor tray 26.

Liquid distributor tray 26 maintains a level of liquid 28 on the tray so that liquid will flow through slotted openings 30 and thence downwardly through the cylindrical downcomer 32 for discharge on a lower tray through slotted openings 34. Each of the downcomers 32 is provided with one or more, preferably two, liquid flow through holes 36 sized to provide some flow of liquid through each downcomer. This flow rate through the holes is only a fraction of that handled by the downcomers in a high flow rate operation.

Distributor tray 26 is also provided with a plurality of interdispersed cylindrical downcomers 38 for hydrogen rich gas charged to the chamber space 40 by spray nozzle arrangement 24 above liquid distributor grid 26. The cylindrical downcomers 38 are provided with "T" shaped baffle means 42 in cross-section comprising a circular top member at the inlet and outlet of downcomer 38 to change the direction of flow of the gas phase.

A second liquid/gas distributor tray 44 is provided with a plurality of open ended downcomers 46 dispersed throughout the horizontal surface of tray 44 to provide liquid/gas flow through passageways in sufficient quantity to provide substantially uniform distribution of the gas/liquid flow over the cross-sectional area of the surface of a bed of catalyst therebelow. Flow through downcomers 46 maintain a level of liquid 48 on tray 44. The liquid flows through weir forming slot means in the upper periphery of the downcomer 46. Liquid flwo through holes, comprising one or more holes 50 provide for at least partial flow of liquid through the holes in a manner similar to that discussed above with respect to downcomers 32. Generally, the level of liquid on tray 44 is not as high as that maintained on tray 26. In the specific arrangement of FIG. I, there are a larger number of downcomers 46 for combined liquid and gas flow than for downcomers 32 on tray 26 and primarily for liquid flow control. The tray arrangements herein briefly discussed may also comprise the same number of liquid downcomers and are arranged to provide a uniform distribution of liquid across the trays and particularly the distribution of a hydrogen saturated liquid phase in conjunction with gaseous hydrogen more uniformly over the cross-sectional area of the upper surface of a bed of ceramic balls 52 of desired size disposed on the upper surface 53 of the fixed bed of catalyst below the lowermost tray 44.

In a specific arrangement, it is contemplated employing a catalyst bed which is approximately 14 feet in diameter and about 30 feet high. It is to be understood, however, that catalyst beds varying considerably in size may be employed and the L/D ratio of the bed of catalyst may be different than one having the above dimensions. In the arrangement above described, the gas/liquid phases charged to the bed of balls above the catalyst is caused to be more intimately dispersed for flow in the pulsing regime downwardly through the catalyst bed. Of course, other reactant flow rates may be practiced or employed including what is identified as the transition regime, gas continuous regime and even the liquid continuous regime. The flow regime employed may also be referred to as the froth flow regime and there may be a combination of two or more flow regimes in different portions of the catalyst bed simultaneously occurring.

In the specific arrangement of FIG. I presented as an example, the bed of catalyst 54 comprising cobalt and molybdenum on alumina is supported by a combination of ceramic balls 56 comprising a bottom layer of $\frac{3}{4}$ inch balls, a middle layer of $\frac{1}{2}$ inch balls and a top layer of $\frac{1}{4}$ inch balls above grid 58 and Glitsch grid means 60 above a perforated baffle product withdrawal means 62 about product collecting chamber 64. Conduit 66, coaxially positioned within the lower portion of chamber 2 extends downwardly from the upper or bottom level of the ceramic balls to a point beneath the vessel to provide means for emptying the reactor of catalyst and ceramic balls. During on stream operation of the reactor, conduit 66 may be filled with the ceramic balls or other means suitable for the purpose may be used to prevent catalyst from entering the conduit before timely desired. The lower end of conduit 66 is sealed to prevent passage of liquid and vapors during operation.

Annular chamber 64 formed by perforated cylindrical baffle 62 with a top annular closure is sized and arranged with respect to layers of the Glitsch grid support members to minimize inherent pressure drop differences in the flow of materials from various radiating sections of the catalyst bed to the central product accumulating withdrawal chamber 64. The annular chamber is connected to a product withdrawal conduit partially shown for passage of the desulfurized product to product separation equipment not shown.

The ceramic ball arrangement referred to above and comprising at least three different ball sizes, supports a bed of catalyst thereabove comprising layers of catalyst varying in particle size. Thus, to better facilitate the flow of reactants through the reactor system, it is proposed to employ a shallow bed of $\frac{1}{8}$ inch particle size catalyst immediately above the above-identified layers of ceramic balls and also beneath the top most shallow layer of $\frac{1}{2}$ or $\frac{3}{4}$ inch balls beneath distributor grid 44. The catalyst particle size intermediate of these catalyst layers is generally about 1/16 inch particle size. It is also contemplated varying segmented portions of the catalyst bed with the different particle size catalyst.

In this specific embodiment, a grid means 58 is made up of $\frac{1}{4}$ inch metal rod to form $\frac{3}{8}$ inch mesh material. That is, the openings between rods forming the mesh will be about $\frac{3}{8}$ inch openings upon which the largest ceramic balls rest as above briefly discussed. Grid means 58 is supported by layers of Glitsch grid means as shown in the drawing and about cylindrical baffle means 62 discussed above.

In the reactor arrangement of this invention, it is desired to limit the pressure drop through the reactor not to exceed about 60 pounds. The liquid saturation nozzle arrangement is designed to limit a pressure drop therethrough not to exceed about 7 pounds and the pressure drop across the liquid distributing trays is of a desired low level.

FIG. II in conjunction with FIG. IV shows a greater detail the liquid spray nozzle means comprising a plurality of separate cylindrical pipes extending downward from each opening 8 and diverging generally outwardly except for the most central nozzle. The annular rings of nozzles are canted away from the vertical a sufficient amount to accomplish substantial turbulent dispersion in chamber 12 contributing to large surface area for contact with introduced hydrogen rich gas by annulus 16. The turbulent mixture thus formed is caused to flow through diffuser plate 18, thereby providing further large surface area mixing conditions. Additional mixing saturation of the liquid with hydrogen occurs in chamber 20 and the orifice plate 22 (FIG. V) with attached annular diverging baffle members 24 shown in FIG. III as well as in FIG. I. The annular baffles are positioned between annular rows of holes in plate 22 as shown in FIG. V and diverge outwardly from the vertical as shown in FIG. III in a manner particularly promoting the formation of droplet of hydrogen saturated liquid over the entire surface area of the liquid on distributor tray 26. It will be recognized by those skilled in the art that the diameter of tray 26 and the height of the nozzle arrangement 22-24 above tray 26 will materially effect the slope of the various annular baffles to achieve the results desired as above expressed.

When employing the reactor system of this invention for hydrodewaxing of hydrocarbons boiling above gasoline, it is particularly desirable to employ a special class of crystalline zeolites represented by ZSM-5 zeolite and characterized as having a pore dimension greater than about 5 Angstroms, a silica to alumina ratio of at least 12 and a constraint index in the range of 1 to 12. The class of zeolites so characterized are exemplied by ZSM-5, ZSM-11, ZSM-12, ZSM-35 and ZSM-38. U.S. Pat. No. 3,702,886 describes and claims ZSM-5.

Having thus generally described the method and apparatus of this invention and described specific embodiments in support thereof, it is to be understood that no undue restrictions are to be imposed by reason thereof except as defined by the following claims.

We claim:

1. A method for catalytically converting under elevated temperatures and pressures a normally liquid hydrocarbon feed material in the presence of hydrogen which comprises, passing a preheated hydrocarbon feed material and hydrogen rich gas through a mixing zone comprising a sequence of high liquid surface area producing mixing zones to effect substantial saturation of the hydrocarbon feed with the hydrogen rich gas, discharging the hydrocarbon feed thus saturated with hydrogen rich gas from said mixing zone as a liquid spray over the cross-sectional area of a reaction zone housing a fixed bed of catalyst effective for hydrogenating said hydrocarbon feed at a temperature within the range of 450° F. to 850° F. and a pressure within the range of 400 to 2000 psig, said fixed bed of catalyst vertically separated from said liquid spray by a plurality of vertically spaced apart confined gas/liquid distributing downcomer zones in the cross-sectional area of said reaction zone, said downcomer zones distributed in a plane of said reaction zone cross-section and arranged to maintain a shallow level of liquid in said plane, said distributed liquid and hydrogen rich gas undergoing catalytic conversion reaction during downward traverse of said catalyst bed, and recovering products of said catalytic reaction through a plurality of low pressure drop zones in open communication with a product withdrawal zone at the bottom of said reaction zone.

2. The method of claim 1 wherein there are two vertically spaced apart but adjacent planes of gas/liquid distributor downcomer zones, the uppermost plane being also provided with a plurality of separate hydrogen rich gas downcomer zones.

3. The method of claim 1 wherein the hydrocarbon fraction being contacted with hydrogen has a gravity within the range of −20° API and about 50° API and comprises sulfur in concentrations within the range of 0.25 to about 6.0 percent by weight.

4. The method of claim 1 wherein the hydrocarbon feed has an initial boiling point within the range of 70° F. to about 800° F. and an end boiling point within the range of 250° F. to about 1050° F. at atmospheric pressure.

5. The method of claim 1 wherein the conversion is desulfurization.

6. The method of claim 1 wherein the conversion is hydrotreating.

7. The method of claim 1 wherein the conversion is hydrofining.

8. The method of claim 1 wherein the conversion is hydrodewaxing.

9. The method of claim 1 wherein the conversion is hydrocracking.

* * * * *